(12) United States Patent
Dillmann et al.

(10) Patent No.: US 9,208,945 B2
(45) Date of Patent: Dec. 8, 2015

(54) STORAGE UNIT FOR STORING ELECTRICAL ENERGY HAVING A LOW-RESISTANCE CONTACTED ENERGY STORE

(75) Inventors: Adolf Dillmann, Muensingen (DE); Stefan Huehner, Kusterdingen (DE); Reiner Holp, Winterlingen (DE)

(73) Assignee: Robert Bosch GmbH, Stuttgart (DE)

( * ) Notice: Subject to any disclaimer, the term of this patent is extended or adjusted under 35 U.S.C. 154(b) by 240 days.

(21) Appl. No.: 14/111,696

(22) PCT Filed: Mar. 13, 2012

(86) PCT No.: PCT/EP2012/054313
§ 371 (c)(1),
(2), (4) Date: Oct. 14, 2013

(87) PCT Pub. No.: WO2012/139837
PCT Pub. Date: Oct. 18, 2012

(65) Prior Publication Data
US 2014/0036411 A1   Feb. 6, 2014

(30) Foreign Application Priority Data
Apr. 13, 2011   (DE) .......................... 10 2011 007 325

(51) Int. Cl.
| | |
|---|---|
| H01G 9/15 | (2006.01) |
| H01G 2/10 | (2006.01) |
| H01G 4/224 | (2006.01) |
| H01G 4/228 | (2006.01) |
| H01G 4/38 | (2006.01) |
| H01G 9/008 | (2006.01) |

(Continued)

(52) U.S. Cl.
CPC ............... *H01G 2/106* (2013.01); *H01G 4/224* (2013.01); *H01G 4/228* (2013.01); *H01G 4/385* (2013.01); *H01G 9/008* (2013.01); *H01G 9/08* (2013.01); *H01M 2/1072* (2013.01); *H01M 2/206* (2013.01); *H01M 2/22* (2013.01)

(58) Field of Classification Search
USPC ......... 361/502, 503–504, 509–512, 517–519, 361/523–525, 529, 535–536, 540–541
See application file for complete search history.

(56) References Cited

U.S. PATENT DOCUMENTS

| | | | |
|---|---|---|---|
| 4,930,045 A | 5/1990 | Carlson et al. | |
| 7,408,764 B1* | 8/2008 | Mueller et al. | ................ 361/502 |

(Continued)

FOREIGN PATENT DOCUMENTS

| | | |
|---|---|---|
| DE | 102008050437 | 4/2010 |
| JP | 11067184 | 3/1999 |

(Continued)

OTHER PUBLICATIONS

International Search Report for Application No. PCT/EP2012/054313 dated Jun. 15, 2012 (2 pages).

*Primary Examiner* — Nguyen T Ha
(74) *Attorney, Agent, or Firm* — Michael Best & Friedrich LLP

(57) ABSTRACT

A storage unit (1, 2, 3, 4) for storing electrical energy, comprising at least one energy store (5, 6, 7, 11) which has a positive electrical connecting terminal (10) and a negative electrical connecting terminal (12) and is designed to be charged and discharged with electrical energy via the positive connecting terminal (10) and the negative connecting terminal (12).

11 Claims, 4 Drawing Sheets

(51) Int. Cl.
*H01G 9/08* (2006.01)
*H01M 2/10* (2006.01)
*H01M 2/20* (2006.01)
*H01M 2/22* (2006.01)

(56) References Cited

U.S. PATENT DOCUMENTS 8,149,568 B2 * 4/2012 Lai et al. .................... 361/502
9,036,332 B2 * 5/2015 Shukla et al. ................ 361/502
2009/0291329 A1 11/2009 Kondou et al.
2010/0053927 A1 3/2010 Inoue et al.

FOREIGN PATENT DOCUMENTS

| | | |
|---|---|---|
| JP | 2007242593 | 9/2007 |
| JP | 2007242860 | 9/2007 |
| WO | 2008067564 | 6/2008 |

* cited by examiner

STORAGE UNIT FOR STORING ELECTRICAL ENERGY HAVING A LOW-RESISTANCE CONTACTED ENERGY STORE

BACKGROUND OF THE INVENTION

The invention relates to a storage unit. The storage unit has at least one energy store, wherein the energy store has a positive and a negative electrical connecting terminal. The energy store is designed to be charged and discharged with electrical energy via the positive and the negative electrical connecting terminal.

The problem exists with storage units having energy stores from the prior art that connecting lines to electrical connecting terminals of the energy store can break when the energy store is moved relative to a housing of the storage unit. In the case of energy stores which are particularly designed as wound electric capacitors, the problem exists that thermal expansions of the wound capacitor can lead to a breakage in the electrical connections in the region of the electrical connecting terminals.

SUMMARY OF THE INVENTION

According to the invention, the storage unit has an electrically conductive contact rail which is at least indirectly connected to the positive connecting terminal, and an electrically conductive contact rail which is at least indirectly connected to the negative connecting terminal. The contact rails are each connected to at least one external electrical connecting terminal of the storage unit. The contact rails are each electrically connected to the respective connecting terminal of the energy store by means of an electrically conductive fibrous web or a strand comprising in each case a plurality of individual lines.

By means of the connection of the contact rail via a strand or a fibrous web to the electrical connecting terminal, for example a Schoop layer of a wound electric capacitor, an electrical connection between the contact rail and the connecting terminals of the energy store is produced because the fibrous web and/or the strand are advantageously designed not to break when movements occur which are caused by thermal expansions.

A fibrous web is a composite of many electrically conductive individual lines, which are preferably embodied as individual fibers. In the case of the fibrous web, the individual lines, in particular the individual fibers, are preferably not mutually aligned and are mechanically connected to one another, in particular interlinked and/or hooked, by means of the irregularity thereof.

In the case of a strand, the individual lines have preferably a substantially mutual alignment. The strand can, for example, be formed from a plurality of interwoven bundles, each bundle comprising a plurality of individual lines. The strand is preferably configured as a planarly designed ribbon-shaped or mat-like strand.

The connecting terminal of the energy store, in particular the electrically conductive layer, can be designed thinner by means of large-surface contacting than is the case with a pointwise contacting. In this way, material can be advantageously saved.

In a preferred manner, a longitudinal alignment of the individual lines of the strand—preferably with a predominant component—extends along a longitudinal direction of the contact rail. When the connecting terminal is moved as a result of heating the energy store, a sliding contact by individual line longitudinal sections can thus advantageously be formed, said longitudinal sections galvanically contacting the connecting terminal, in particular an electrically conductive layer, such that a sliding contact is formed.

In another embodiment, a longitudinal alignment of the individual lines of the strand extends with at least one transverse component or transversely to a longitudinal direction of the contact rail. This can thus have the advantageous result that, for example, in the case of a pointwise attachment of sections of the individual lines to the electrical connecting terminal, a moving connection which is caused by thermal expansion bends the individual fibers transversely relative to the longitudinal direction thereof. In a further preferred manner, a longitudinal extension of the individual strands runs transversely to a longitudinal extension of the energy store in this embodiment.

When being heated up, the energy store is, for example, designed to expand more greatly along the longitudinal extension thereof than along a transverse extension running transversely thereto. In the case of a wound electric capacitor, this is particularly the case if the winding axis about which the electrodes of the wound capacitor are wound runs transversely to the longitudinal extension of the energy store.

In a preferred embodiment, at least a portion or only a portion of the individual lines of the fibrous web or the strand on a longitudinal section of the individual lines is particularly galvanically connected to the electrical connecting terminal of the energy store and thus forms a sliding contact for contacting the connecting terminal.

The individual lines preferably contact the electrical connecting terminal of the energy store or additionally the contact rail with a longitudinal section of the fibrous web or the strand, which is not an end section of said strand or said fibrous web. A large-surface, galvanic contact between a face of a flat extension of said strand or said fibrous web and the connecting terminal, in particular a Schoop layer, and furthermore preferably of an opposing face of the longitudinal section to the contact rail is thus advantageously produced.

In a further preferred manner, a portion of the individual lines is connected to the electrical connecting terminal of the energy store by means of welding or soldering.

The galvanic connection of a portion of the individual lines to the electrical connecting terminal of the energy store and or to the contact rail can be designed independently of or additionally to the electrical connection by means of welding or soldering.

In addition to the welded or soldered connection, the strand or the fibrous web, in particular a portion of the individual lines, can furthermore be galvanically connected in an advantageous manner with a longitudinal section thereof to the electrical connecting terminal.

The individual lines are preferably gold- or silver-plated. In this way, a sliding contact can be formed which is resistant to oxidation and which galvanically contacts the electrically conductive layer of the energy store, in particular the Schoop layer, during thermal expansion and contraction. In a further advantageous manner, the connecting terminal, in particular the electrically conductive layer, can comprise silver or gold. The electrically conductive layer preferably has a silver or gold layer designed for making sliding contact.

By means of the welded or soldered connection, an electrical connection between the fibrous web or the strand and the electrical connecting terminal, in particular a Schoop layer of a wound electric capacitor, can be formed, said electrical connection being resistant to the effects of oxidation on the electrical contacting terminal and to moisture.

By means of the connection formed in this manner, the galvanic contacting, which is produced by means of a multiplicity of contact locations of the individual lines to the contacting terminal, in particular to the electrically conductive layer, can form a connection ancillary to the welded or soldered connection. The additional galvanic connection can advantageously ensure the electrical contact between the contact rail and the electrical connecting terminal via the strand or the fibrous web if, for example, the welded or soldered connection breaks as a result of vibrations or tears due to loading.

The connecting terminal of the energy store is preferably designed as an electrically conductive layer. In particular in the case of a connecting terminal in the form of an electrically conductive layer, a low-resistance connection between the connecting terminal of the energy store and the contact rail can further be advantageously formed.

In a preferred embodiment, the fibrous web or the strand is disposed between the contact rail extending preferably in a planar manner and the electrical connecting terminal. The fibrous web or the strand has preferably a planar extension, for example as a type of mat. A layer arrangement can thus be advantageously formed—similar to a sandwich arrangement, wherein the strand or the fibrous web is disposed between the connecting terminal of the energy store, which is preferably configured as an electrically conductive layer, and a planarly extending region of the contact rail.

The fibrous web or the strand lies with its full planar extension of one side on the connecting terminal and with an opposite side with the full planar extension thereof on the contact rail, in particular on a section of the contact rail extending parallel to said connecting terminal.

The strand or the fibrous web, in particular the individual lines, is formed resiliently-deformable transversely to a planar extension. In so doing and by means of the galvanic connection, the strand can advantageously spring back even in the case of thermal deformations, for example a wave deformation of the electrically conductive layer, and compensate for the deformation to hold the galvanic connection. To this end, the strand or the fibrous web can connect with a planar extension thereof an electrically conductive layer forming the connecting terminal and the preferably planarly extending contact rail and thus form a connective layer. The individual lines of the resiliently designed strand or the fibrous web preferably comprise an admixture consisting of chrome, silver, iron, titanium, silicon and for the most part copper.

The proportions of the admixture are preferably 0.5% chrome, 0.1% silver, 0.08% iron, 0.06% titanium and 0.03% silicon. An electrical conductivity of the strand or the fibrous web amounts to preferably at least 40, preferably 46 mega-Siemens per meter.

The material of the strand or the fibrous web is, for example, a copper alloy according to the US alloy designation system: Unified numbering system C18080.

In a preferred embodiment, at least one portion of the individual lines is connected to the electrical connecting terminal of the energy store by means of welding or soldering and the at least one portion or another portion of the individual lines is galvanically connected to the electrical connecting terminal of the energy store. The number of the galvanic connections of individual lines to the connecting terminal is preferably greater than the number of the soldered or welded connections of the individual lines to the connecting terminal. In this way, a reliable and furthermore low-resistance, galvanic contact between the strand or the fibrous web and the electrical connecting terminal can be formed, said contact advantageously complementing the welded or soldered contact.

In a preferred embodiment, at least one portion of the individual lines of the fibrous web or the strand is welded or soldered with a longitudinal section thereof to the contact rail. In this way, two mutually different contactings of the strand to the contact rail can advantageously be formed by means of the strand or the fibrous web as when contacting the fibrous web or the strand to the electrical connecting terminal. In an advantageous manner, the one contacting between the strand or the contact rail is welded or soldered and thus forms a close material composite between the strand and the contact rail. In this way, the contact rail can have a strand and/or fibrous web covering. In an arrangement of two contact rails as walls spaced apart from one another, the fibrous web or strand covering can face into an interior space where a connecting terminal of an energy store can be contacted.

The second type of contacting between the strand or the contact rail is advantageously galvanic and is preferably produced by a plurality of individual line longitudinal sections which is in effective galvanic contact with the contact rail, in particular with a face of the contact rail.

In a preferred embodiment of the invention, the positive connecting terminal and the negative connecting terminal of the energy store are formed by an electrically conductive layer, in particular a Schoop layer. The Schoop layer is preferably an alloy comprising copper and zinc. In a further or an additional embodiment, the Schoop layer comprises an aluminum layer or an alloy comprising aluminum.

The fibrous web and/or strand are preferably comprised predominantly of copper. In a preferred embodiment, the fibrous web and/or the strand comprise an alloy of copper and zinc.

In an advantageous embodiment of the invention, the individual lines of the strand or the fibrous web are gold- or silver-plated. In so doing, a good galvanic contact with the connecting terminal and the contact rail can be produced.

A thickness dimension of a planarly designed strand or a planarly designed fibrous web is, for example, between 0.5 and 2 millimeters, preferably 1 millimeter.

A single fiber of the fibrous web or the strand preferably has a diameter between 0.01 and 0.3 millimeters, preferably between 0.1 millimeter and 0.5 millimeter.

A tin-plated copper strand is also conceivable as the strand. In so doing, a pointwise soldering of the strand with tin solder is facilitated.

The contact rail is preferably formed from copper or an alloy containing copper. The contact rail is, for example, tinned with a tin layer. The tin layer is, for example, between 3 micrometers and 10 micrometers. A thickness of a contact rail designed from sheet metal is, for example, between 0.5 and 2 millimeters, preferably 1 millimeter.

A longitudinal dimension of the storage unit is, for example, between 10 and 30 cm. A spacing of the contact rails is, for example, between 3 and 5 centimeters.

The storage element can advantageously comprise energy stores having longitudinal dimensions between the positive and negative connecting terminal that are different from one another. The longitudinal dimensions differing from one another can be advantageously compensated by the strand or the fibrous web.

BRIEF DESCRIPTION OF THE DRAWINGS

The invention is described below with the aid of the figures and further exemplary embodiments. Further advantageous embodiment variants ensue from the features of the figures and the features of the dependent claims.

DETAILED DESCRIPTION

Figure 1:
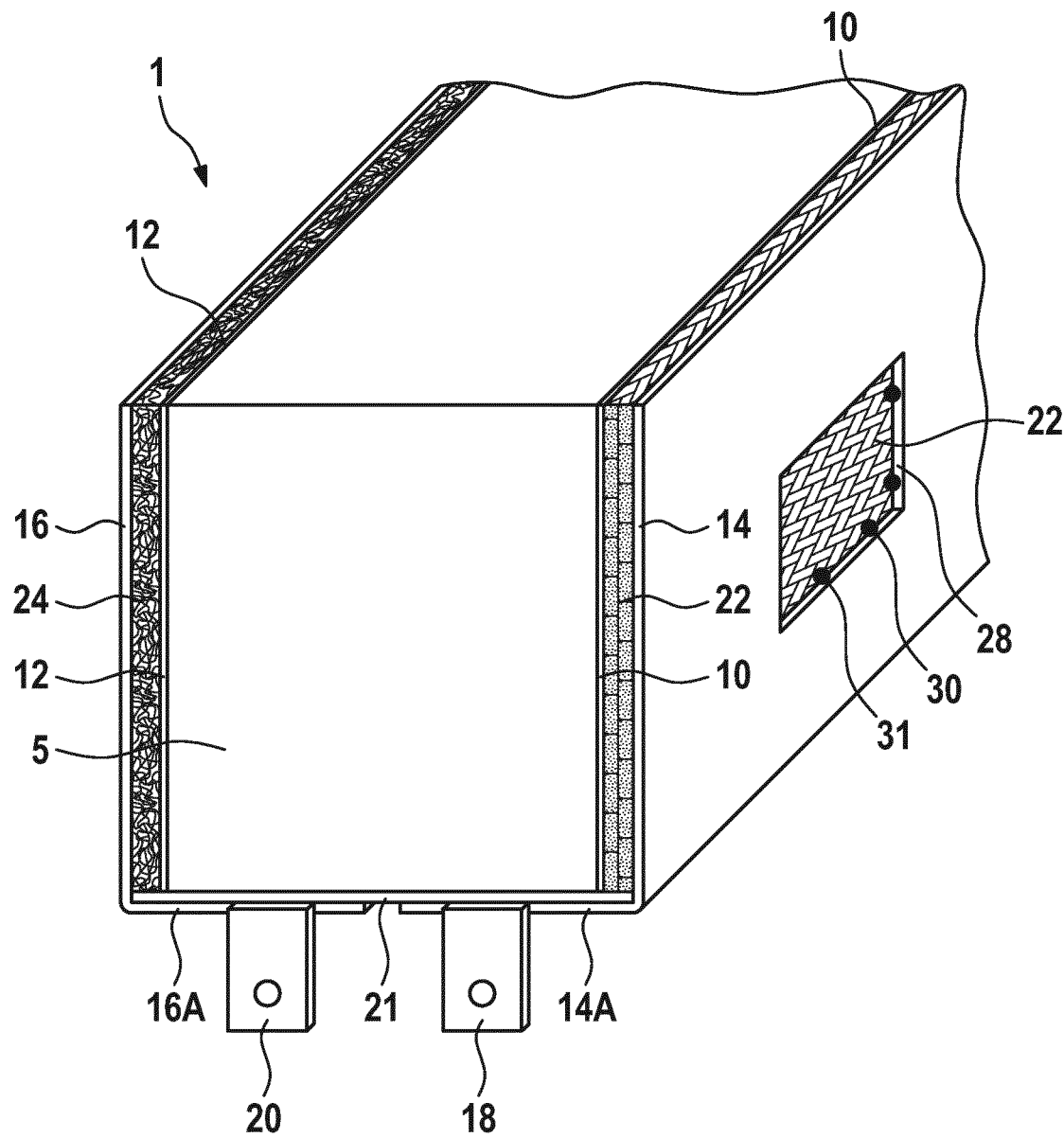
FIG. 1 shows an exemplary embodiment for a storage unit comprising a contact rail which is connected to an electrical connecting terminal of an energy store of the storage unit via a strand mat and/or a fibrous web mat.

FIG. 1 shows an exemplary embodiment for a storage unit 1. The storage unit 1 comprises an energy store 5 which is a capacitor, in particular a wound electric capacitor, in this exemplary embodiment. It is also conceivable that an accumulator, in particular a lithium accumulator, be used instead of the capacitor 5. The storage unit 1 has an electrically conductive contact rail 14 and an electrically conductive contact rail 16. The contact rails are in each case formed by a sheet metal plate angled along a longitudinal extension of the contact rail.

The contact rails 14 and 16 together form a type of channel or tray, wherein an angled section 14a of the contact rail 14 and an angled section 16a of the contact rail 16 together form a bottom of the channel or, respectively, the tray. The bottom is electrically insulated from the energy store by means of an insulation layer 21, for example, consisting of polyethylene or polyimide.

An external connecting terminal 20 is connected to the section 16a, said connecting terminal being embodied in this exemplary embodiment as a sheet metal strip and being integrally formed with said section 16a. An external connecting terminal 18 is integrally formed with the section 14a, said connecting terminal being designed as a sheet metal strip like the connecting terminal 20. The contact rails 14 and 16 are made in this exemplary embodiment from sheet metal. The sheet metal has, for example, a sheet thickness between 0.5 and 2 millimeters.

The energy store 5 has a positive electrical connecting terminal 10 and a negative electrical connecting terminal 12. The connecting terminals 10 and 12 are in each case designed as an electrically conductive layer. The layer has, for example, a layer thickness between 0.3 and 1 millimeter. The energy store 5 is at least partially, in this exemplary embodiment completely, accommodated in the channel formed by means of the contact rails 14 and 16. The electrical connecting terminals 10 and 12, which are in each case designed as a layer, are disposed respectively on a front face of the energy store and run parallel to one another in this exemplary embodiment. Walls of the channel are formed by means of the contact rails 14 and 16, said walls extending parallel to one another. The electrical connecting terminal 10 of the energy store 5 extends parallel to the contact rail 14 so that the connecting terminal 10 and the wall formed by means of the contact rail 14 enclose a hollow space between one another. The contact rail 16, in particular a wall of the channel formed by means of said contact rail 16, runs parallel to and spaced apart from the connecting terminal 12 so that a hollow space extends between the contact rail 16 and the connecting terminal 12. In this exemplary embodiment, an electrically conductive fibrous web 24 is disposed in the hollow space between the connecting terminal and the contact rail 16. The fibrous web is a copper fibrous web in this exemplary embodiment, which comprises a plurality of electrically conductive, fibrous individual lines, wherein the individual lines are aligned in an irregular manner with respect to each other.

A planarly designed strand is disposed in the hollow space between the connecting terminal 10 and the contact rail 14. The strand is formed by means of a wire mesh, wherein wire-shaped individual lines of the wire mesh extend substantially in a common braiding direction.

In this exemplary embodiment, the strand 22 forms a type of flat mat, which at least partially, in this exemplary embodiment completely, fills the hollow space between the connecting terminal 10 and the contact rail 14. The individual lines of the strand 22 make contact with one another; thus enabling a galvanic contact to be established between the individual lines by means of the contact. The strand 22 contacts with at least a longitudinal section of a portion of the individual lines, which are disposed in the region of the connecting terminal 10, the electrically conductive layer of the energy store 5 formed by the electrical connecting terminal 10. The individual lines of the strand 22 which run in the region of the contact rail 14 make contact with said contact rail 14 at least on a longitudinal section. A galvanic contact is thus produced between the contact rail 14 and the connecting terminal 10.

In addition to the galvanic contact, a welded or soldered contact is established between the contact rail 14 and the connecting terminal as follows:

The contact rail 14 has an aperture 28. The aperture 28 forms a type of window in this exemplary embodiment. In the region of an edge of the window, the contact rail 14 is connected to at least a longitudinal section of at least one individual line of the strand by means of a spot weld 30. Further spot welds are also depicted, of which the spot weld 31 is denoted by way of example. The strand 22 can also with at least a portion of the individual lines at least on a longitudinal section of said portion of the individual lines be connected to the connecting terminal 10 by means of spot welding or soldering. To this end, the strand, in particular individual lines of the strand, can, for example, be opened through the window 28 by means of an appropriate tool, and a portion of the individual lines can be welded or soldered to the connecting terminal 10 through the opening formed in the aforementioned manner. Thus, in addition to the previously described galvanic contact between the contact rail 14 and the connecting terminal 10, which is established by means of the strand 22, a close material connection can be established in a point-wise manner at least in sections in this exemplary embodiment. The material connection ensures a further good electrical connection between the contact rail 10 and the electrical connecting terminal 10 of the energy store 5. If, for example, the welded connection or soldered connection breaks, the galvanic electrical connection thus continues to exist. In this manner, a reliable electrical contact is provided between the contact rail 14 and the connecting terminal 10. A further advantage of the contacting formed in this manner is that the contact rail 14 and the connecting terminal 10 are connected to one another over a large area. Because the connecting terminal 10—just as the connecting terminal 12—is designed as an electrically conductive layer, said electrically conductive layer is not only connected in a point-wise manner or, respectively, in some surface sections to the contact rail 14 and there too not only to a surface region of the contact rail 14, but rather a full surface area of the contact rail 14, which faces a full surface area of the connecting terminal,—except for interstices between individual lines that are adjacent to one another and make contact with the connecting terminal 10 or the contact rail 14—is electrically connected by means of the planarly designed strand 22.

The electrical connection between the contact rail 16 and the connecting terminal 12 can, as previously described in the example of the connecting terminal 10, be produced only galvanically by means of the strand 22 or the fibrous web or additionally by means of a welded or soldered connection.

The embodiment of the electrical connecting means for gavanically connecting as a fibrous web 24 or as a strand 22 is provided by way of example.

A storage unit 1 is also conceivable which has only a strand 22 for electrically connecting the connecting terminals 10 and 12 to the contact rails 14 or 16.

A storage unit 1 is also conceivable which has only a fibrous web 24 for electrically connecting the connecting terminals of the energy store 10 to the contact rails.

A storage unit 1 as depicted in FIG. 1 is also conceivable which has a strand 22 as well as a fibrous web 24 for electrically connecting the electrical connecting terminals of the energy store to the contact rails. Instead of the spot welds 30, 31, a further strand section can advantageously be clamped between the mat-like strand 22 and the contact rail 14, said strand section being soldered or welded to the contact rail from the outside in the region of a free end.

Figure 2:
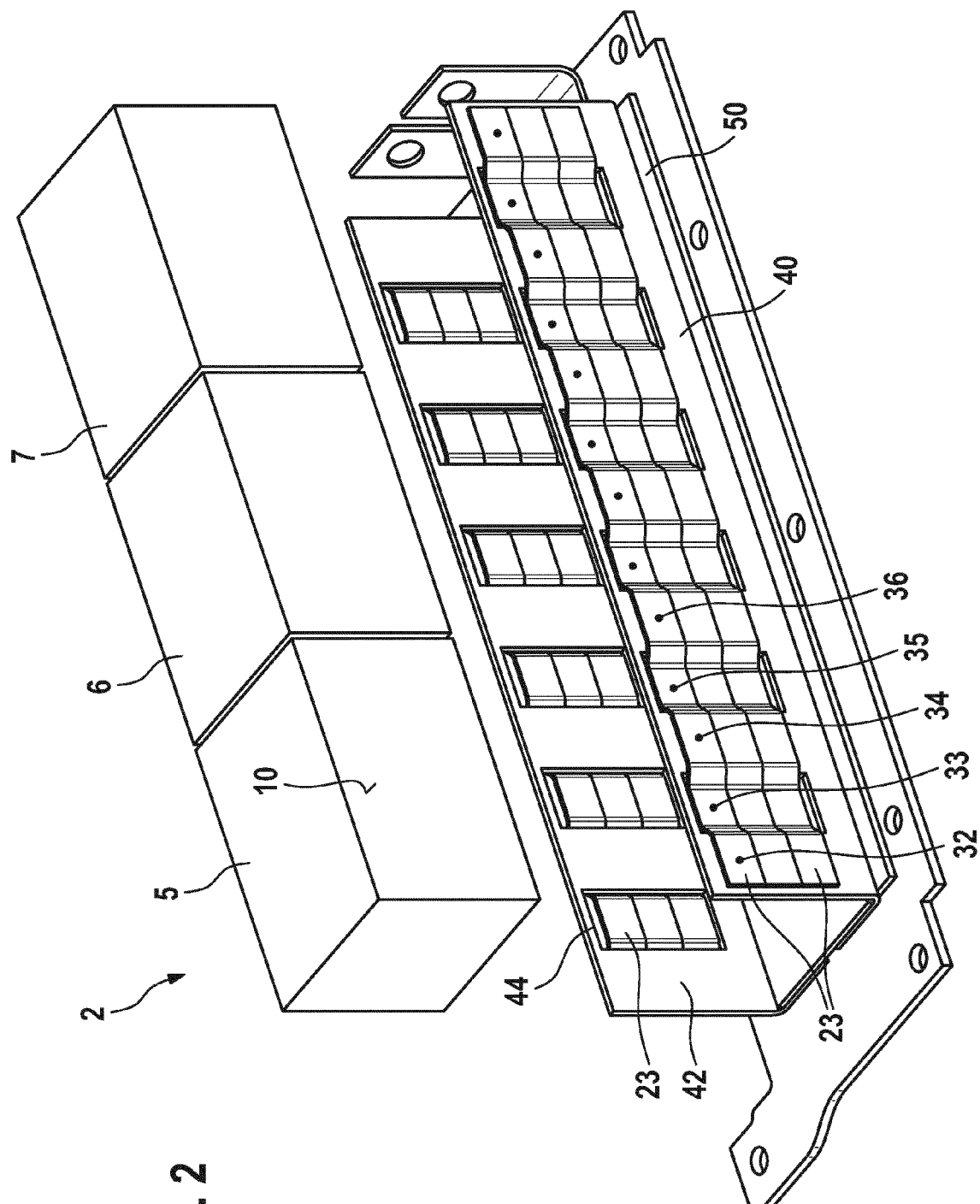
FIG. 2 shows an exemplary embodiment for a storage unit, the contact rails of which have apertures and the flat strands of which are connected to the contact rails along a longitudinal direction of said contact rails and protrude with a longitudinal section through the apertures in order to contact a connecting terminal of an energy store through the aperture.

FIG. 2 shows an exemplary embodiment for a storage unit 2. The storage unit 2 has an energy store 5 as well as further energy stores 6 and 7. The energy stores 5, 6, 7 are in each case separated from one another by an electrical insulation layer. The energy store 5 has a positive electrical connecting terminal 10, which is designed in this exemplary embodiment as an electrically conductive layer, in particular as a Schoop layer. The storage unit 2 also comprises an electrically conductive contact rail 42 for connecting to a negative electrical connecting terminal which is not visible in FIG. 2 and is disposed on an opposite front face of the energy store 5. The contact rails 40 and 42 together form a type of channel or tray in which the energy stores 5, 6 and 7 can be accommodated. The contact rail 40 has six apertures in this exemplary embodiment, each forming a type of window. The contact rail 42 has likewise six apertures, each forming a type of window. The aperture 44 is denoted by way of example. The contact rail 40 is connected to a planarly designed, ribbon-shaped strand 23, wherein the strand is attached to webs disposed between the apertures by means of spot welds and is thus electrically connected to the contact rail 40. The spot welds 32, 34 and 36 are denoted by way of example. The strand 23 protrudes between the webs through the apertures into an interior space of the channel which accommodates the energy stores 5, 6 and 7. If the energy stores 5, 6 and 7, which are depicted in an exploded view together with the channel, have been inserted into the channel, the strand 23 can be spot-welded to the electrical connecting terminal 10, which is designed in this exemplary embodiment as an electrically conductive layer, at welding points 33, 35 and at further strand longitudinal sections which protrude through the apertures into the interior space. The spot welds 33 and 35 are denoted by way of example.

In this exemplary embodiment, the storage unit 2 has a plate-shaped carrier 50 with which the contact rails 40 and 42 are connected. The contact rails 40 and 42 are each connected to an external electrical connecting terminal; thus enabling the storage unit 2 to be electrically contacted from the outside in order to electrically charge and in turn discharge the energy stores 5, 6 and 7 via the contact rails 40 and 42.

Figure 3:
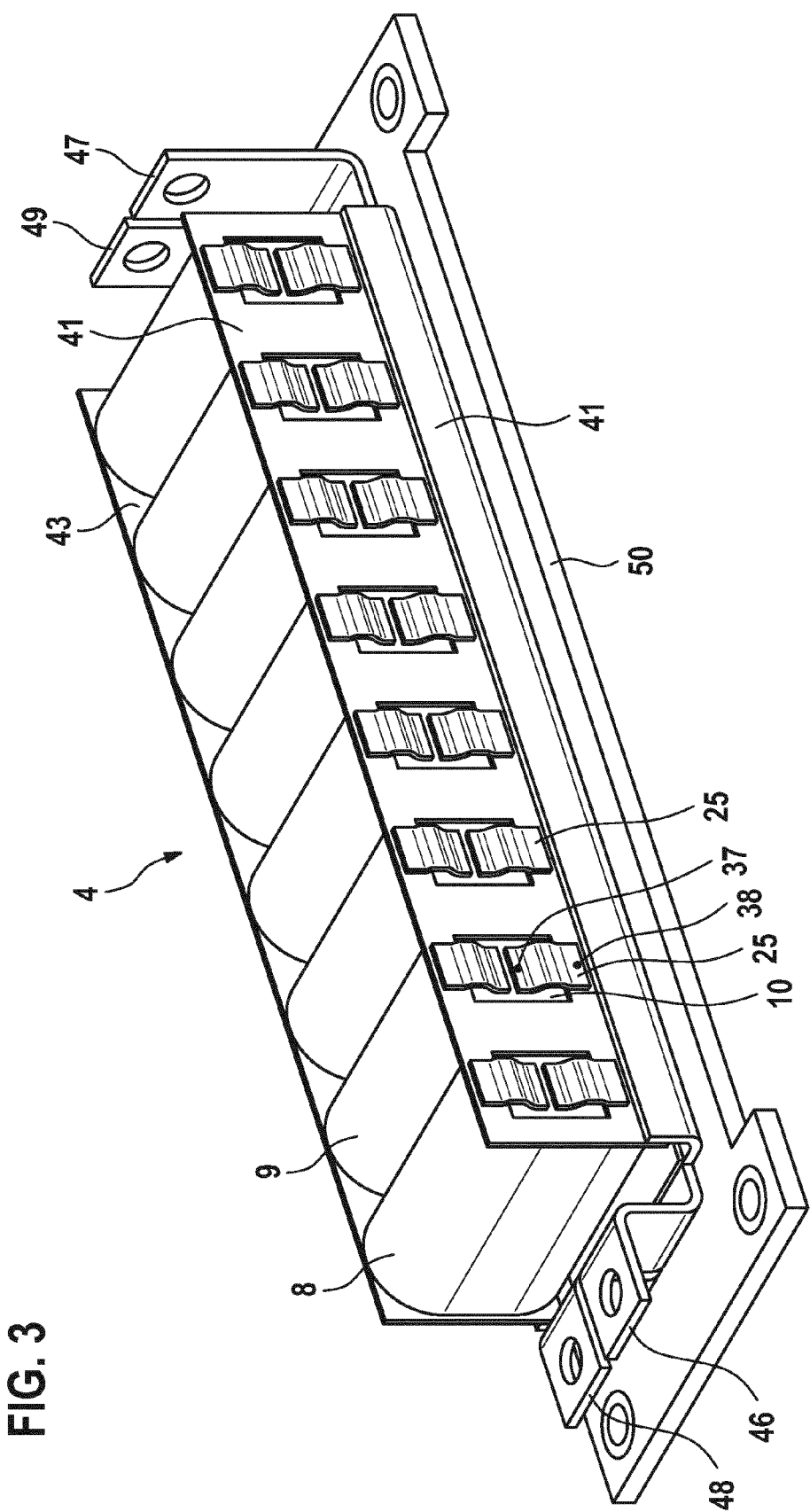
FIGS. 3 and 4 show in each case an exemplary embodiment for a storage unit, the contact rails of which have apertures and flat strands of which are connected to the contact rails transversely to a longitudinal direction of said contact rails and protrude with a longitudinal section through the apertures in order to contact a connecting terminal of an energy store through the aperture.

FIG. 3 shows an exemplary embodiment for a storage unit 4 which like the storage unit 2 comprises a carrier 50 which is connected to contact rails 41 and 43. The contact rails 41 and 43 together form a type of channel, in which the energy stores, in this exemplary embodiment wound electric capacitors, are accommodated. Said contact rails 41 and 43 are in each case composed of two sheet metal plates. The wound electric capacitors 8 and 9 are denoted by way of example. The contact rail 41 has an aperture for each positive connecting terminal of the energy stores. The contact rail 43 has an aperture for each negative connecting terminal of the energy stores. The contact rail 41 is electrically connected to the positive connecting terminals of the energy stores by means of strand 25. To this end, the strand 25 is connected to the positive connecting terminal of the energy stores by at least one spot weld 37. The positive connecting terminal is formed, for example, by an electrically conductive layer, in particular a Schoop layer. The strand 25 is connected to the contact rail 14 by means of a spot weld 38 which is spaced apart from the spot weld 37 along a longitudinal extension of the strand. The strand 25 can additionally galvanically contact the positive connecting terminal to the spot weld 37. The positive connecting terminal 10 of the energy store 9 is denoted by way of example. External connecting terminals 46 and 47 of the contact rail 41 are also depicted, said connecting terminals being disposed in each case at ends of a longitudinal extension of the contact rail 41 that are opposite to one another. The contact rail 43 has external connecting terminals 48 and 49 which are disposed respectively at ends of the contact rail 43 opposite to one another and are integrally formed on the same in this exemplary embodiment.

The contact rail 43—not visible in FIG. 3—is connected to negative electrical connecting terminals of the energy stores like the contact rail 41.

Figure 4:
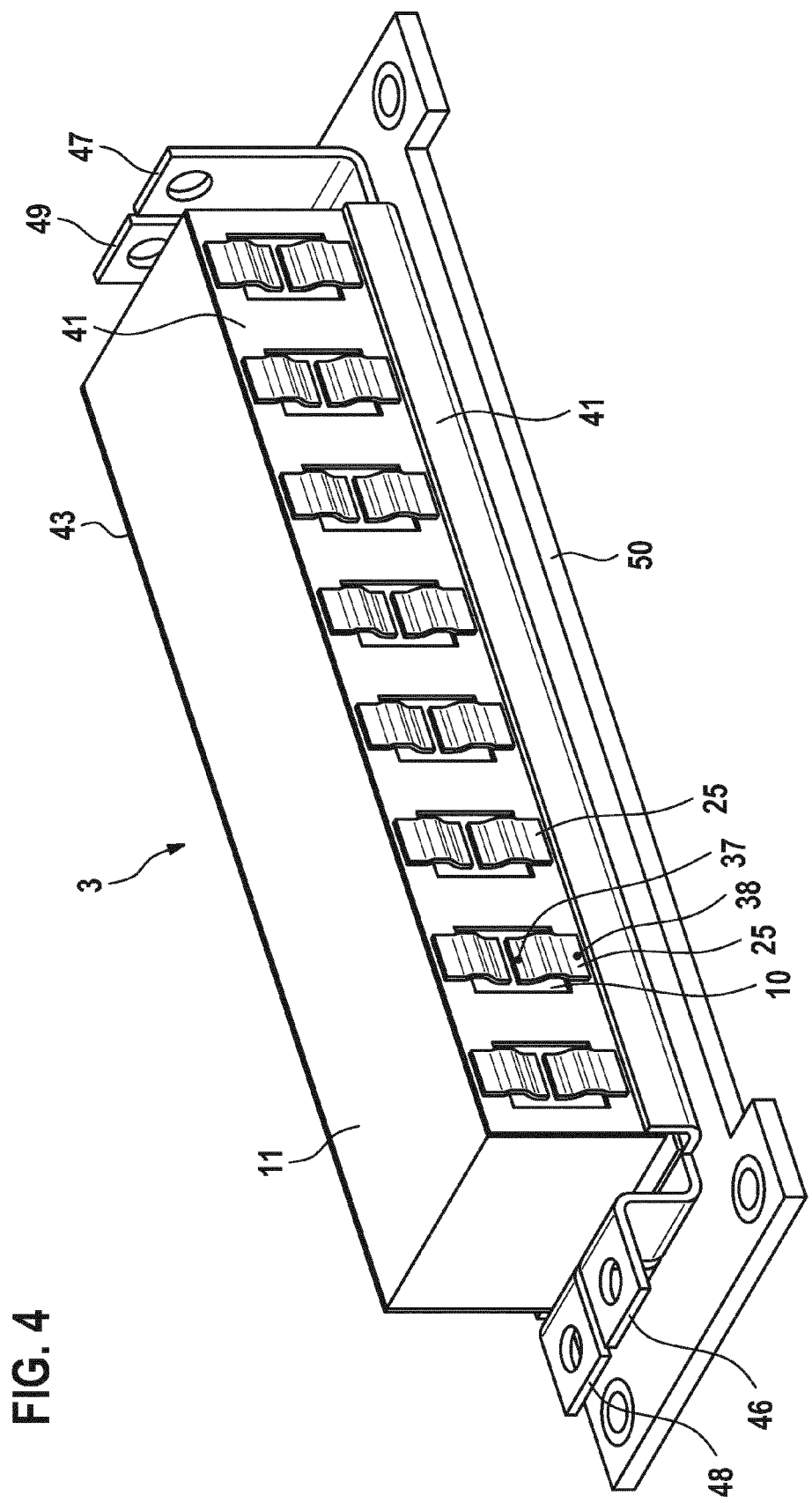

FIG. 4 shows an exemplary embodiment of a storage unit 3. Like the storage unit 4, the storage unit 3 comprises a carrier 50 which is connected to the contact rails 41 and 43. The contact rails 41 and 43 together form a channel which accommodates an energy store 11. The energy store 11 has an ashlar design in this exemplary embodiment. Electrically conductive layers are configured in each case on the front faces of the energy store 11, said electrically conductive layers forming in each case an electrical connecting terminal of the energy store 11—as connecting terminal 10 is in the case of the energy store 5 in FIG. 2. The energy store 11, like the energy stores 8 and 9, is electrically connected to the contact rails 41 and 43 by means of the strand 25. In this way, a welded or soldered contact can advantageously be provided between the strand 25 and the electrical connecting terminal 10 as well as a galvanic contact by means of strand regions which make contact with and thus galvanically contact the electrically conductive layer forming the connecting terminal 10.

The storage unit 3 and the storage unit 4 can have respectively a plastic housing, which encloses the contact rails 41 and 43 with the energy stores. The housing can advantageously have walls which have projection regions that press into the apertures of the contact rails onto the strands 25 in the region of the apertures. If, for example, the welded connection 37 breaks or tears due to vibrations, the strands disposed next to the welded connection can at least galvanically contact the connecting terminal 10 on a longitudinal section of the individual lines of the strand as a result of the housing projection pressing against the strand. The housing can, for example, be designed as a plastic housing, in particular a molded housing.

The invention claimed is:

1. A storage unit (1, 2, 3, 4) for storing electrical energy, comprising at least one energy store (5, 6, 7, 11) which has a positive electrical connecting terminal (10) and a negative electrical connecting terminal (12) and is designed to be charged and discharged with electrical energy via the positive connecting terminal (10) and the negative connecting terminal (12), characterized in that the storage unit (1, 2, 3, 4) has an electrically conductive contact rail (14) which is at least indirectly connected to the positive connecting terminal (10), and an electrically conductive contact rail (16) which is at least indirectly connected to the negative connecting terminal (12), wherein the contact rails (14, 16) are each connected to at least one external electrical connecting terminal (18, 20) of the storage unit (1), wherein the contact rails (14, 16) are each electrically connected to the respective connecting terminal (10, 12) of the energy store (5, 6, 7, 11) by means of at least one of an electrically conductive fibrous web (24) and a strand (22), each comprising a plurality of individual lines.

2. The storage unit (1, 2) according to claim 1, characterized in that the strand (22) is a planarly designed strand woven from individual lines, the individual lines of which extend along a longitudinal direction of the contact rail (12, 14, 40, 42).

3. The storage unit (3, 4) according to claim 1, characterized in that the strand (22) is a ribbon-like strand woven from individual lines, the individual lines of which extend having a transverse component or transversely to a longitudinal direction of the contact rail (41, 43).

4. The storage unit (1, 2, 3, 4) according to claim 1, characterized in that at least a portion of the individual lines on a longitudinal section of said individual lines is connected to the electrical connecting terminal (10, 12) of the energy store (5, 6, 7, 11).

5. The storage unit (1, 2, 3, 4) according to claim 4, characterized in that a portion of the individual lines is connected to the electrical connecting terminal (10, 12) of the energy store (5, 6, 7, 11) by means of welding or soldering.

6. The storage unit (1, 2, 3, 4) according to claim 4, characterized in that a portion of the individual lines is galvanically connected to the electrical connecting terminal (10, 12) of the energy store (5, 6, 7, 11) and thus forms a sliding contact for contacting the connecting terminal.

7. The storage unit (1, 2, 3, 4) according to claim 1, characterized in that at least a portion of the individual lines is connected to the electrical connecting terminal (10, 12) of the energy store (5, 6, 7, 11) by means of welding or soldering and the at least one portion or another portion of the individual lines is galvanically connected to the electrical connecting terminal of the energy store (5, 6, 7, 11), wherein a number of galvanic connections of individual lines to the connecting terminal is greater than a number of soldered or welded connections of the individual lines to the connecting terminal (10, 11).

8. The storage unit (1, 2, 3, 4) according to claim 7, characterized in that the at least one portion of the individual lines of the fibrous web (24) or the strand (22) is welded or soldered with a longitudinal section thereof to the contact rail (14, 16).

9. The storage unit (1, 2, 3, 4) according to claim 1, characterized in that the positive connecting terminal (10) and the negative connecting terminal (11) are formed in each case by an electrically conductive layer.

10. The storage unit (1, 2, 3, 4) according to claim 1, characterized in that the at least one of the fibrous web (24) and the strand (22) are predominantly comprised of copper.

11. The storage unit (1, 2, 3, 4) according to claim 1, characterized in that the positive connecting terminal (10) and the negative connecting terminal (11) are formed in each case by a Schoop layer.

* * * * *